United States Patent
Tao et al.

(10) Patent No.: US 8,584,252 B2
(45) Date of Patent: Nov. 12, 2013

(54) ELECTRONIC DEVICE AND COPYRIGHT PROTECTION METHOD OF AUDIO FILE THEREOF

(75) Inventors: Qiang Tao, Shenzhen (CN); Lian Liu, Shenzhen (CN); Jin-Jie Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 290 days.

(21) Appl. No.: 13/163,743

(22) Filed: Jun. 20, 2011

(65) Prior Publication Data

US 2012/0272324 A1  Oct. 25, 2012

(30) Foreign Application Priority Data

Apr. 20, 2011  (CN) .......................... 2011 1 0099293

(51) Int. Cl.
*G06F 7/04*  (2006.01)
(52) U.S. Cl.
USPC ........................................................... 726/26
(58) Field of Classification Search
USPC ................. 726/26, 30, 27, 32, 33; 725/87, 93
See application file for complete search history.

(56) References Cited

U.S. PATENT DOCUMENTS

| 7,200,575 B2 * | 4/2007 | Hans et al. ................... 705/59 |
| 7,921,221 B2 * | 4/2011 | Minborg et al. ............. 709/231 |
| 8,024,762 B2 * | 9/2011 | Britt .............................. 725/92 |
| 2011/0088098 A1 * | 4/2011 | Wu ................................ 726/26 |

* cited by examiner

*Primary Examiner* — Beemnet Dada
(74) *Attorney, Agent, or Firm* — Altis & Wispro Law Group, Inc.

(57) ABSTRACT

A copyright protection method is applied to an electronic device. The method includes: obtaining digital data of an audio file via Video on Demand (VOD); determining whether or not the audio file is free to use; determining whether or not the accessing of the audio file is legal if the audio file is not free. Upon a condition that the audio file is free, or the accessing of the audio file is legal and not free, decoding the audio file into analog signals. Upon a condition that digital copyright information is not included in the audio file, inserting into the analog signals the digital copyright information; outputting the analog signals of the audio file along with digital copyright information of the audio file. Upon a condition that the audio file is not free and not legally permitted, indicating the accessing of the audio file is illegal. The electronic device is also provided.

6 Claims, 2 Drawing Sheets

ELECTRONIC DEVICE AND COPYRIGHT PROTECTION METHOD OF AUDIO FILE THEREOF

CROSS-REFERENCE TO RELATED APPLICATIONS

Related subject matters are in copending applications entitled, "ELECTRONIC DEVICE AND COPYRIGHT PROTECTION METHOD OF AUDIO DATA THEREOF", filed Apr. 6, 2011 (application Ser. No. 13/080,669) and "ELECTRONIC DEVICE AND DECODING METHOD OF AUDIO DATA THEREOF", filed Jun. 19, 2011 (Ser. No. 13/163,722), and assigned to the same assignee as named herein.

BACKGROUND

1. Technical Field

The present disclosure relates to security of multimedia information, and more particularly to an electronic device and copyright protection method of audio files obtained via Video on Demand (VOD) thereof.

2. Description of Related Art

Traditional copyright protection method of audio files obtained via VOD is watermarking digital data of the audio files, thereby tracking the audio files obtained illegally.

However, after the digital data is decoded into analog signals to display on terminal devices, the audio files could also be illegally used.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Embodiments of the present disclosure will now be described in detail below, with reference to the accompanying drawings.

Figure 1:
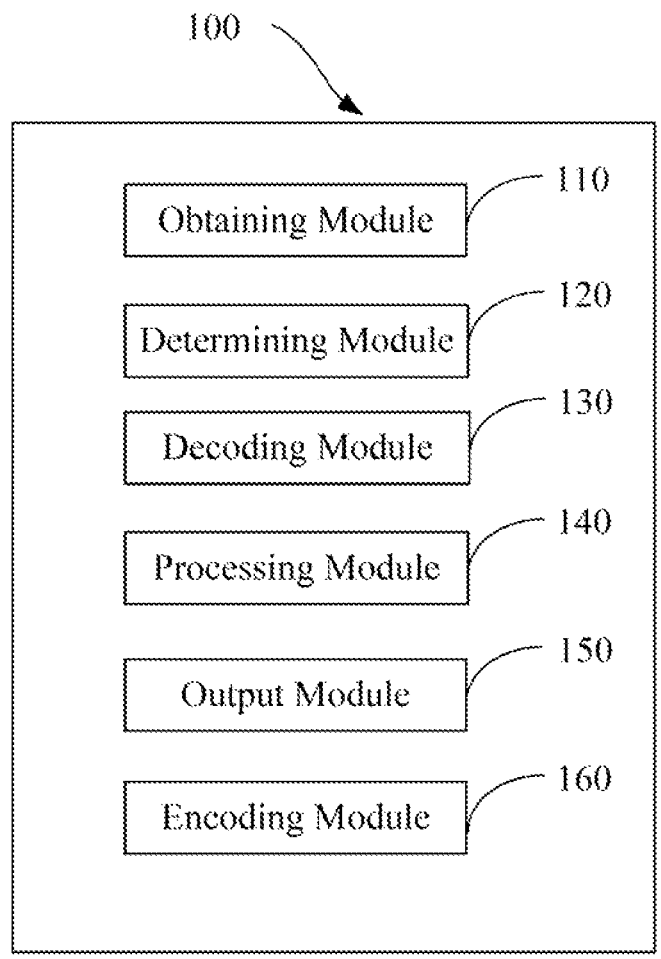
FIG. 1 is a block diagram of one embodiment of an electronic device in accordance with the present disclosure.

The present disclosure discloses inserting digital copyright information of an electronic device after digital data of audio files obtained via VOD are decoded into analog signals. FIG. 1 is a block diagram of one embodiment of an electronic device 100 in accordance with the present disclosure.

The electronic device 100 may be a set-top box (STB) and the digital copyright information may be a serial number of the electronic device 100 or a unique serial number of the set-top box, for example. In an embodiment, the digital copyright information (e.g., the serial number) is a binary number including a number of bits, each bit of the binary number representing a symbol, each of the same time length.

In an embodiment, the electronic device 100 includes an obtaining module 110, a determining module 120, a decoding module 130, a processing module 140, an output module 150, and an encoding module 160.

The obtaining module 110 obtains the digital data of the audio files via VOD from a network.

The determining module 120 determines whether or not the audio files are free (i.e., costing nothing) for users to use. Typically, the audio files may include fee-charging information. The determining module 120 can read the fee-charging information and determine whether or not the audio files are free based upon the charge information.

The processing module 140 determines whether or not the audio files are to be legally used, that is, whether or not a user has the permission/authority to use the audio files if the audio files are not free to use. In particular, the user is required to input an authority key to the electronic device 100 if the audio files are not free. The processing module 140 receives the authority key and determines whether or not the user has the authority to use the audio files based upon the authority key.

The decoding module 130 decodes the digital data of the audio files into the analog signals if the audio files are free to use or the user has the authority.

The encoding module 160 inserts digital copyright information in the analog signals when the decoding module 130 decodes the digital data of the audio files. An embodiment of a method of inserting digital copyright information in the analog signals is already provided in the copending application entitled, "ELECTRONIC DEVICE AND COPYRIGHT PROTECTION METHOD OF AUDIO DATA THEREOF".

The encoding module 160 could also determine whether or not the decoded analog signals already includes the digital copyright information, and sends a signal to the output module 150 when the decoded analog signals already includes the digital copyright information. An embodiment of a method of inserting digital copyright information in the analog signals is already provided in the copending application entitled, "ELECTRONIC DEVICE AND DECODING METHOD OF AUDIO DATA THEREOF".

The output module 150 indicates that the user has the authority. In detail, the output module 150 indicates a message, such as "illegal accessing", when the user has no authority. The output module 150 also outputs the analog signals including the digital copyright information when the user has the authority and the digital copyright information are already contained in the audio files.

Figure 2:
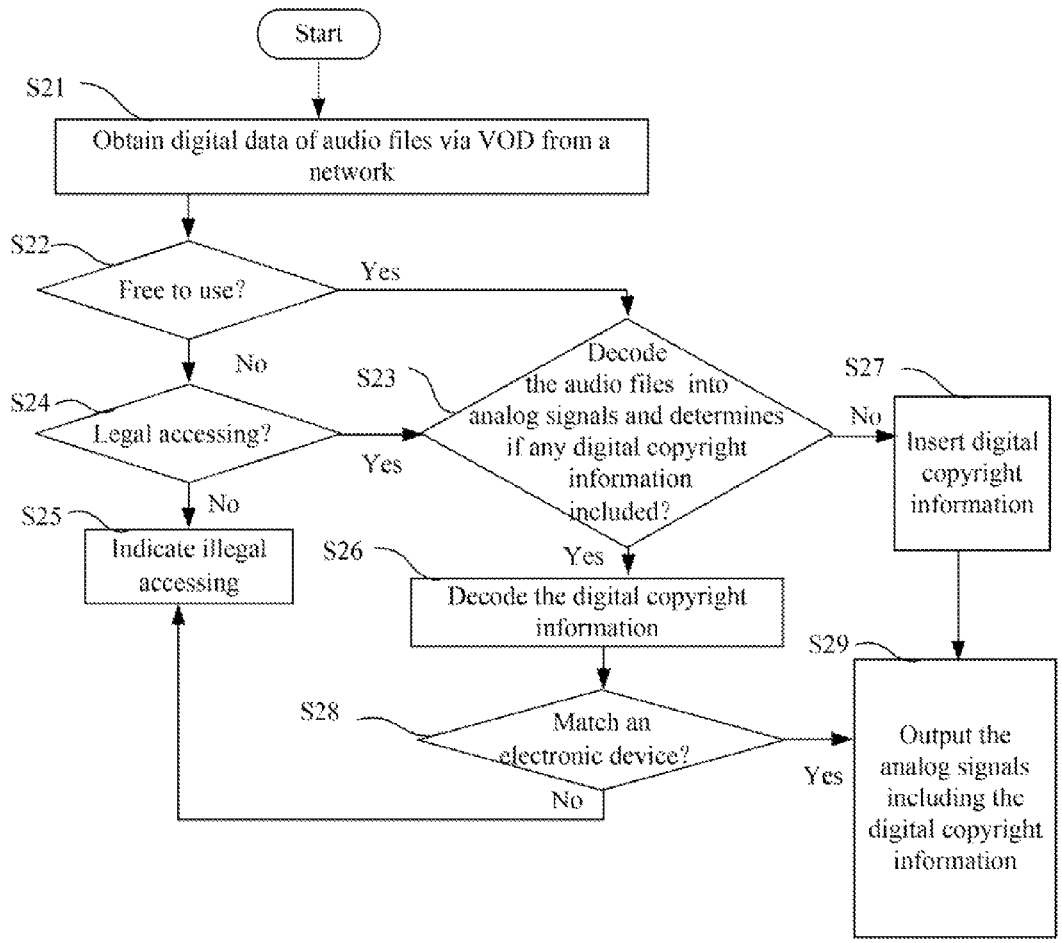
FIG. 2 is a flowchart of one embodiment of a copyright protection method of audio files obtained via VOD in accordance with the present disclosure.

FIG. 2 is a flowchart of one embodiment of a copyright protection method of the audio files obtained via VOD in accordance with the present disclosure.

In step S21, the obtaining module 110 obtains digital data of audio files via VOD from network.

In step S22, the determining module 120 determines if the audio files are free for users to use. If yes, the procedure goes to step S23, if no, the procedure goes to step S24.

In step S23, the decoding module 130 decodes the digital data of the audio files and the encoding module 160 determines whether or not the decoded analog signals already includes the digital copyright information, if yes, the procedure goes to step S26, if no, the procedure goes to step S27.

In step S24, the processing module 140 determines whether or not the audio files are to be legally used, that is, whether or not the user has the permission/authority to use the audio files. If yes, the procedure jumps to step S23, if no, the procedure goes to step S25.

In step S25, the output module 150 indicates that the accessing of the audio files is illegal when the user has no authority.

In step S26, the encoding module 160 decodes the digital copyright information when the audio files already include the digital copyright information.

In step S27, the encoding module 160 inserts the digital copyright information in the analog signals when the decoding module 130 decodes the digital data of the audio files.

In step S28, the encoding module 160 determines if the decoded digital copyright information matches the digital copyright information of the electronic device 100, that is, if the decoded digital copyright information is the digital copyright information of the electronic device 100. If yes, the procedure goes to step S29, if no, the procedure goes to step S25. In more detail, the encoding module 160 can compare the serial number of audio files with the serial number of the electronic device 100. If the two serial numbers are identical, the decoded digital copyright information matches the digital copyright information of the electronic device 100.

In step S29, the encoding module 160 sends the signal to the output module 150 to output the analog signals including the digital copyright information.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A copyright protection method of audio files in an electronic device, the method comprising:
    obtaining digital data of an audio file via Video on Demand (VOD) from a network;
    determining whether or not the audio file is free to use;
    decoding the audio file into analog signals when the audio file is free to use;
    determining, by a processing module in the electronic device, whether or not an accessing of the audio file is legal when the audio file is not free to use;
    decoding the audio file into analog signals when the accessing of the audio file is legal;
    inserting into the analog signals the digital copyright information when digital copyright information is not included in the audio file;
    outputting the analog signals of the audio file along with the digital copyright information of the audio file; and
    indicating the accessing of the audio file is illegal when the accessing of the audio file is not legal.

2. The copyright protection method of claim 1, further comprising:
    determining whether or not the audio file already includes the digital copyright information;
    when the audio file already includes the digital copyright information, determining whether or not the decoded digital copyright information matches digital copyright information of the electronic device;
    when the decoded digital copyright information matches the digital copyright information of the electronic device, outputting the analog signals including the digital copyright information; and
    when the decoded digital copyright information does not matches the digital copyright information, indicating the accessing of the audio file is illegal.

3. The copyright protection method of claim 1, wherein the electronic device is a set-top box (STB) and the digital copyright information may be a serial number of the electronic device or a unique serial number of the set-top box.

4. An electronic device for implementing a copyright protection method, the electronic device comprising:
    an obtaining module configured for obtaining digital data of an audio file via Video on Demand (VOD) from a network;
    a determining module configured for determining if the audio file is free to use;
    a processing module configured for determining if an accessing of the audio file is legal when the audio file is not free to use;
    a decoding module configured for decoding the digital data of the audio file into analog signals when the audio file is free to use and when the accessing of the audio file is legal;
    an encoding module configured for inserting digital copyright information into the analog signals when the decoding module decodes the digital data of the audio file when digital copyright information is not included in the audio file; and
    an output module configured for outputting the analog signals including the digital copyright information and indicating the accessing of the audio file is illegal when the accessing of the audio file is not legal.

5. The electronic device of claim 4, wherein the encoding module is further configured for determining whether or not the analog signals already include the digital copyright information before inserting the digital copyright information, the decoding module is configured for decoding the digital copyright information when the analog signals already include the digital copyright information, the encoding module is configured for determining whether or not the digital copyright information matches that of the electronic device, the outputting module is configured for outputting the analog signals when the digital copyright information matches that of the electronic device and indicating the accessing of the audio file is not legal when the digital copyright information does not match that of the electronic device.

6. The electronic device of claim 4, wherein the electronic device is a set-top box (STB) and the digital copyright information may be a serial number of the electronic device or a unique serial number of the set-top box.

* * * * *